(12) United States Patent
Bartha et al.

(10) Patent No.: US 8,579,352 B2
(45) Date of Patent: Nov. 12, 2013

(54) SHADING ARRANGEMENT FOR A LEADING-CAR WINDSHIELD

(75) Inventors: Michael Bartha, Leutershausen (DE); Elisabeta-Mihaela Comsa, Oberhausen (DE)

(73) Assignee: Siemens Aktiengesellschaft, Munich (DE)

( * ) Notice: Subject to any disclaimer, the term of this patent is extended or adjusted under 35 U.S.C. 154(b) by 154 days.

(21) Appl. No.: 13/120,523

(22) PCT Filed: Sep. 2, 2009

(86) PCT No.: PCT/EP2009/061346
§ 371 (c)(1),
(2), (4) Date: Mar. 23, 2011

(87) PCT Pub. No.: WO2010/034598
PCT Pub. Date: Apr. 1, 2010

(65) Prior Publication Data
US 2011/0192554 A1 Aug. 11, 2011

(30) Foreign Application Priority Data
Sep. 23, 2008 (DE) .......................... 10 2008 048 565

(51) Int. Cl.
*B60J 3/02* (2006.01)
(52) U.S. Cl.
USPC ....................................... 296/97.11; 296/214
(58) Field of Classification Search
USPC .................. 296/97.11, 214, 97.4, 97.8, 97.9; 160/37
See application file for complete search history.

(56) References Cited

U.S. PATENT DOCUMENTS

| 2,289,644 | A | * | 7/1942 | Gano, Jr. ........................ 160/33 |
| 2,559,471 | A | * | 7/1951 | Schrock .................... 296/97.11 |
| 4,674,789 | A | * | 6/1987 | Watjer et al. ................. 296/97.1 |
| 4,925,233 | A | | 5/1990 | Clark |
| 4,929,014 | A | * | 5/1990 | Clark et al. .................. 296/97.8 |
| 5,064,238 | A | * | 11/1991 | Mohtasham ................. 296/97.6 |
| 5,219,199 | A | * | 6/1993 | Smith et al. ................. 296/97.8 |
| 5,720,508 | A | | 2/1998 | Mohammed |
| 7,216,917 | B2 | * | 5/2007 | Tadakamalla ............... 296/97.4 |
| 7,445,276 | B2 | | 11/2008 | Gonzalez Merino et al. |
| 2004/0155489 | A1 | * | 8/2004 | Kawasaki .................... 296/214 |
| 2007/0080558 | A1 | | 4/2007 | Heselhaus et al. |
| 2007/0205636 | A1 | | 9/2007 | Gonzalez Merino et al. |

FOREIGN PATENT DOCUMENTS

| CN | 1960889 A | 5/2007 |
| DE | 4440478 A1 | 4/1995 |
| DE | 198 01 170 A1 | 7/1999 |
| DE | 20 2004 018 915 U1 | 2/2005 |
| EP | 1 731 341 A1 | 12/2006 |
| EP | 1 803 599 A1 | 7/2007 |
| EP | 1666292 B1 | 12/2009 |

(Continued)

*Primary Examiner* — Glenn Dayoan
*Assistant Examiner* — Sunsurraye Westbrook
(74) *Attorney, Agent, or Firm* — Laurence A. Greenberg; Werner H. Stemer; Ralph E. Locher

(57) ABSTRACT

A shading device for a carriage windshield of a rail vehicle has a frame structure which is provided for attaching to the underside of the carriage roof. The frame structure supports a generally plate-shaped sunscreen, and the sun screen can be attached to the frame structure in a movable manner by a guide device. The guide device has a middle guideway and two outer radial guideways.

6 Claims, 3 Drawing Sheets

(56) References Cited

FOREIGN PATENT DOCUMENTS

| | | | |
|---|---|---|---|
| FR | 2773520 | A1 | 7/1999 |
| KR | 100783432 | B1 | 12/2007 |
| RU | 76289 | U1 | 9/2008 |
| WO | 2005032867 | A2 | 4/2005 |
| WO | 2005102755 | A1 | 11/2005 |

\* cited by examiner

SHADING ARRANGEMENT FOR A LEADING-CAR WINDSHIELD

BACKGROUND OF THE INVENTION

Field of the Invention

The invention relates to a shading arrangement for a windshield of a rail vehicle leading car.

Modern high-speed trains are often very problematic to darken on account of a streamlined form of the leading car and correspondingly curved windshields. However, the high solar irradiation and the dazzling effect that occur in the case of these windshields, which are often arranged at very shallow angles, have to be consistently inhibited on account of the decisive safety factor for a train driver.

Hitherto, in order to shade the windshield of a leading car, use has been made of manually or electrically driven arrangements which have one, two, or even three combined fabric blinds and—at a greater or lesser distance from the windshield—suppress the dazzling effect of the sun. In the case of the Deutsche Bahn ICE-3 series, a sun visor was used for the first time which already had a nonlinear, curved profile. This was achieved by corresponding articulations. However, this device reaches its limits very quickly, since it cannot be extended as desired with regard to movement path and windshield curvature. In addition, the shading medium used here consists of fabric blinds, which have design-related disadvantages. Such disadvantages are primarily the sensitivity with respect to mechanical loads, which can lead to fraying in the edge region, wrinkling and warping of the fabric blinds. Visual defects can also occur, for example creasing, soiling, adhesive bonding, etc.

BRIEF SUMMARY OF THE INVENTION

On this basis, the object of the invention is to provide a shading arrangement for a windshield of a leading car, in the case of which the associated sun visor extends close to the windshield, wherein in particular a given curvature of the windshield in the longitudinal and transverse directions can be taken into account.

In the case of the shading arrangement mentioned at the beginning, this object is achieved in that the shading arrangement has a frame structure which is provided for fastening to a roof underside of the leading car, the frame structure supports a generally panel-like sun visor, and the sun visor is fastened in a movable manner to the frame structure by means of a guide device which has one central and two outer radial guides.

According to the invention, no fabric blinds are thus used, but rather a generally panel-like sun visor made, for example, of GRP. This can be moved by means of a plurality of radial guides from an initial position into a shading position. This obviates in particular all the design-related disadvantages of the fabric blinds known from the prior art.

Preferably, of the three radial guides, two are configured in a fixed manner with respect to the frame structure and one is configured such that it moves conjointly with the frame structure. In this case, the central radial guide is typically driven, so that the sun visor can be moved between the two positions.

Preferably, the two outer radial guides are configured in a fixed manner and the central radial guide is configured such that it moves conjointly. The two outer radial guides can each have guide rods on which the sun visor is mounted in each case such that its position can be adjusted. This makes it possible to compensate if appropriate also for three-dimensional deviations in the geometry of the sun visor.

It can be provided that, in order to orient the outer guide rods in a parallel manner, the frame structure has height-adjustable stops that act in a manner substantially perpendicular to the sun visor.

BRIEF DESCRIPTION OF THE SEVERAL VIEWS OF THE DRAWING

Exemplary embodiments of the invention are explained in more detail hereinbelow with reference to the drawings, in which.

DESCRIPTION OF THE INVENTION

Figure 1:
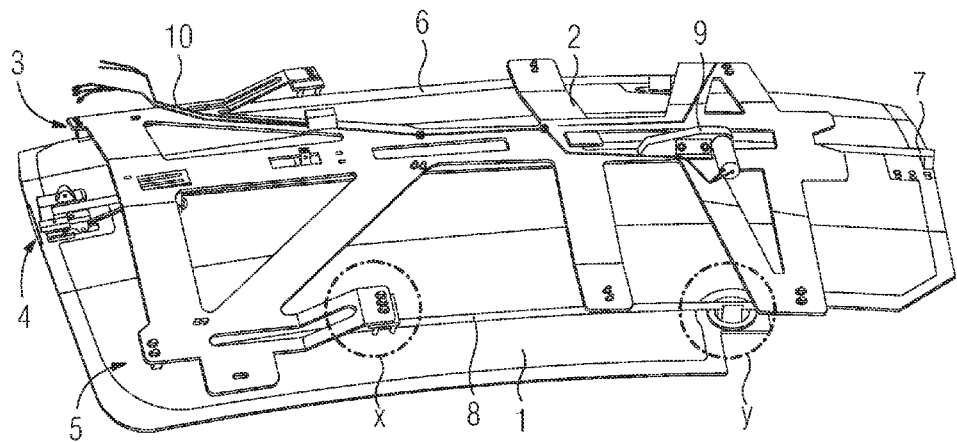
FIG. 1 shows a perspective view from above of a shading arrangement for a windshield of a leading car.

FIG. 1 illustrates the general structure of a shading arrangement for a windshield of a leading car of a rail vehicle. A sun visor 1 is supported by a frame structure 2. The sun visor 1 is located underneath the frame structure 2 in the illustration in FIG. 1. In order to extend the sun visor 1, it is moved to the left in FIG. 1, while the frame structure 2 maintains its position.

The sun visor 1 is guided with respect to the frame structure 2 with the aid of three radial guides 3, 4, 5. Each of the radial guides 3, 4, 5 comprises an associated guide rod 6, 7, 8.

The two outer guide rods 6, 8 are fixedly connected to the frame structure 2, with the two ends of the guide rods 6, 8 being secured to the frame structure 2 via suitable fastening devices.

The central guide rod 7 is fixedly connected to the sun visor 1 and thus moves conjointly therewith, i.e. when the sun visor 1 is extended, the guide rod 7 moves conjointly.

The rear end of the guide rod 7 is secured to the rear end of the sun visor 1 via a suitable fastening device. The guide rod 7 runs from the rear edge of the sun visor 1 as far as the front edge thereof. At the front edge of the sun visor 1, the associated end of the guide rod 7 is likewise attached to the sun visor 1 by way of a fastening device.

The sun visor 1 is moved between its extended and retracted positions with the aid of an electromotive drive 9. Cable supply lines 10 are assigned to the electromotive drive 9.

Figure 2:
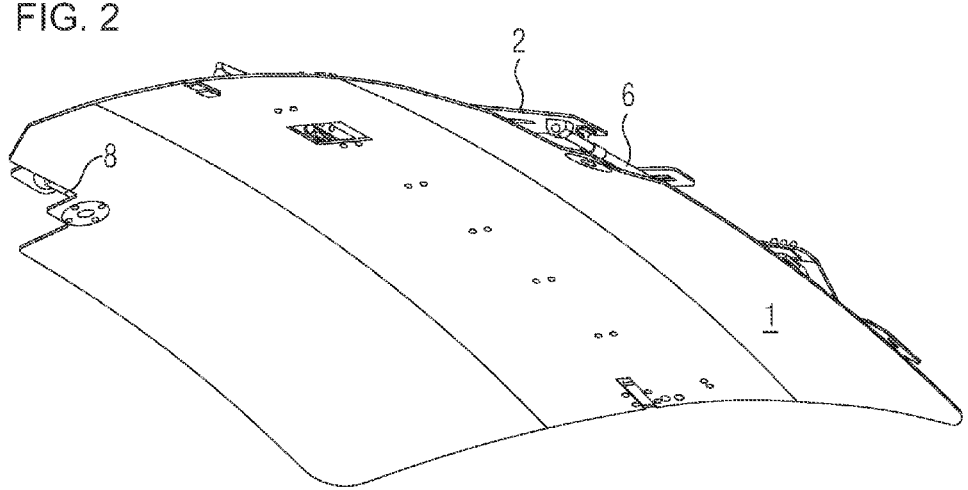
FIG. 2 shows a perspective view from below of the shading arrangement in FIG. 1.

FIG. 2 shows the shading arrangement in a view from below, wherein in particular the general form of the sun visor 1 is illustrated.

Figure 3:
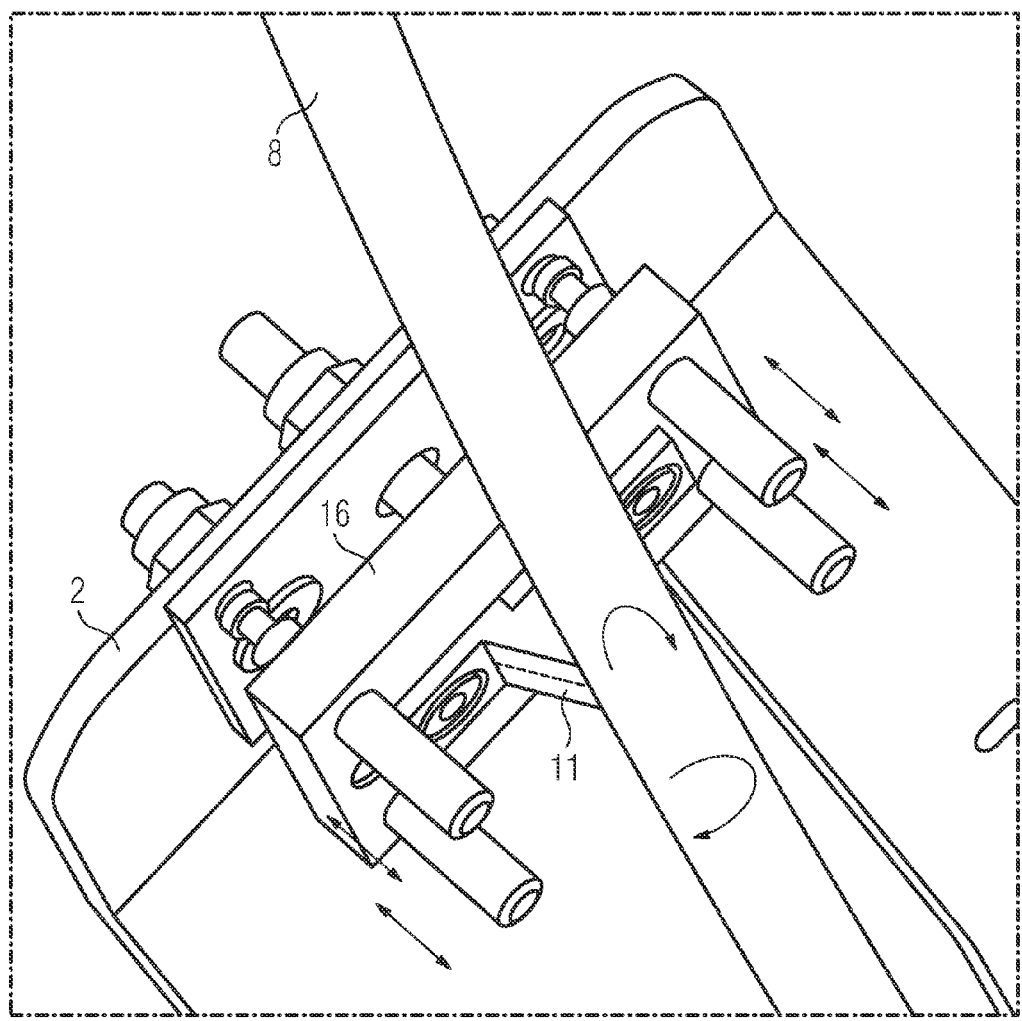
FIG. 3 shows a detail view of a detail "X" from FIG. 1.

FIG. 3 shows a detail "X" from FIG. 1. A stop 10 is provided in a height-adjustable manner on an associated holding portion of the frame structure 2, wherein the height adjustment is provided with the aid of suitable screw/thread units. The stop 10 has a bar 11 which protrudes in the direction of the outer guide rod 8 and against which an outside of the guide rod 8 comes into abutment.

Since the two outer guide rods 6, 8 interact with corresponding stops 10, the two outer guide rods 6, 8 can be aligned in a parallel manner via the height adjustment of the stops 10. This means that both sides of the sun visor 1 are at approximately the same distance from the shaded windshield in the extended state.

Figure 4:
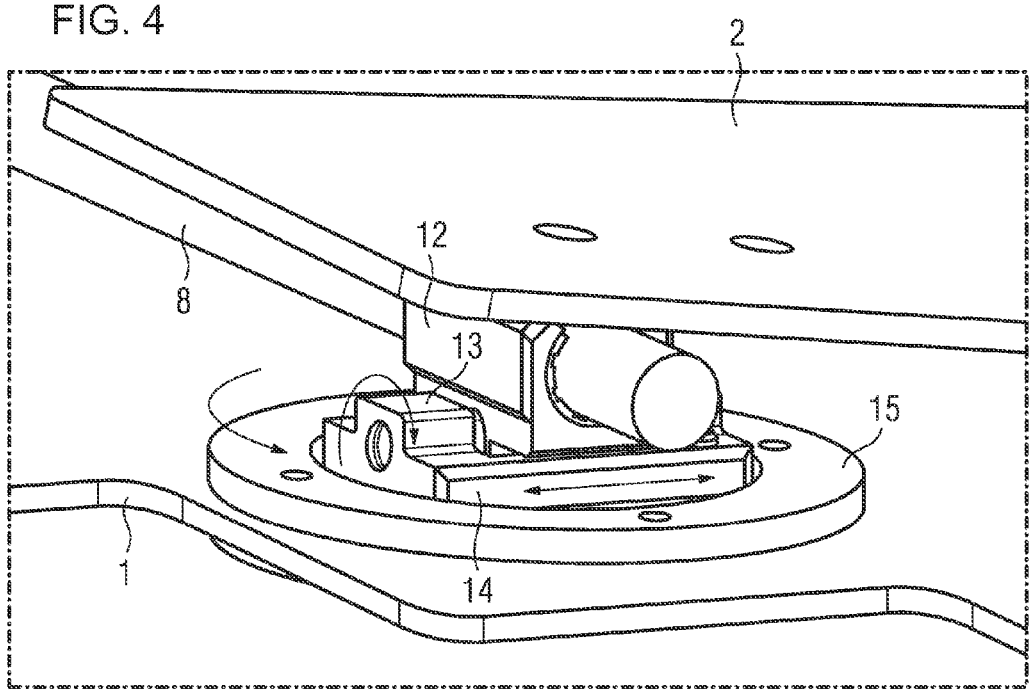
FIG. 4 shows a detail view of a detail "Y" from FIG. 1.

FIG. 4 illustrates a detail "Y" from FIG. 1, in particular mounting of the sun visor 1 on the outer guide rod 8. Functionally identical mounting of the sun visor 1 on the outer guide rod 6 is also provided.

A mounting device is constructed in a multi-part manner such that the position of a holding element 12 engaging around the outer guide rod 8 can be adjusted in three dimensions. The holding element 12 can be displaced substantially transversely to the sun visor 1 along a groove 13 which is provided in an intermediate element 14. The intermediate element 14 is mounted such that it can rotate about an axis in the transverse direction of the sun visor 1, with the result that angular deflections are possible. The intermediate element 14 is mounted in turn within a holding ring 15. The holding ring 15 is mounted in the body of the sun visor 1 such that it can rotate about an axis in the normal direction to the sun visor 1. Overall, this results in the possibility of adjusting in three dimensions the position of the holding element 12 and thus the relative position of the sun visor 1 with respect to the outer guide rod 8. Since the same mounting is also provided for the guide rod 6, it becomes possible for any deviations in the geometry to be taken into account by corresponding adjustment of the mountings of the sun visor 1 on the outer guide rods 6, 8.

The central radial guide 4, in particular the central guide rod 7, which is driven in a linear manner, moves conjointly with the sun visor 1. The central guide rod 7 is attached to the sun visor 1 via fastening elements at intervals over its entire length.

The outer guide rod 8 maintains its position in relation to the frame structure 2 in the retracted and extended states of the sun visor 1. During the transition from the retracted to the extended position, the holding element 12 of the mounting means moves forward along the guide rod 8 until an end position is reached.

It should be emphasized that the type of structure of the shading arrangement also enables emergency unlocking which makes it possible, in the event of the on-board electrical system failing, to manually retract the sun visor 1 within a short period of time.

Furthermore, it is pointed out that the sun visor 1 can be produced, for example, from glass-reinforced plastic, which does not have the disadvantages mentioned at the beginning pertaining to fabric blinds and also meets very high fire protection requirements.

It also enables the shading arrangement to have a very small installation space height, thereby leading to an increase in the field of view of a train driver and thus contributing to an increase in safety. The sun visor 1 is covered completely by a roof lining when it is not being used. Furthermore, the cockpit of the leading car has a generally more airy and roomy effect.

The invention claimed is:

1. A shading configuration for a windshield of a rail vehicle leading car, the shading configuration comprising:
    a frame structure for fastening to a roof underside of the rail vehicle leading car;
    a guide device having three radial guides including a central radial guide and two outer radial guides, said three radial guides extending substantially parallel to one another, two of said three radial guides being configured in a fixed manner with respect to said frame structure and one being configured for moving conjointly with said frame structure; and
    a sun visor fastened in a movable manner to said frame structure by said guide device in a movement direction substantially parallel to said three radial guides.

2. The shading configuration according to claim 1, wherein said two outer radial guides are configured in a fixed manner and said central radial guide is configured such that it moves conjointly.

3. The shading configuration according to claim 1, wherein said two outer radial guides each have guide rods on which said sun visor is mounted in each case such that a position of said sun visor can be adjusted.

4. The shading configuration according to claim 3, wherein said sun visor is mounted in each case such that a position of said sun visor can be adjusted in three dimensions.

5. The shading configuration according to claim 3, wherein said frame structure has height-adjustable stops that act in a manner substantially perpendicular to said sun visor for orienting said guide rods in a parallel manner.

6. The shading configuration according to claim 1, wherein said central radial guide has a guide rod that is driven in a linear manner in order to move said sun visor between a retracted position and an extended position.

* * * * *